No. 684,934. Patented Oct. 22, 1901.
W. HIBBS & T. H. SEEVERS.
CORN HARVESTER.
(Application filed Mar. 14, 1901.)
(No Model.) 4 Sheets—Sheet 1.

William Hibbs & T. H. Seevers, Inventors.

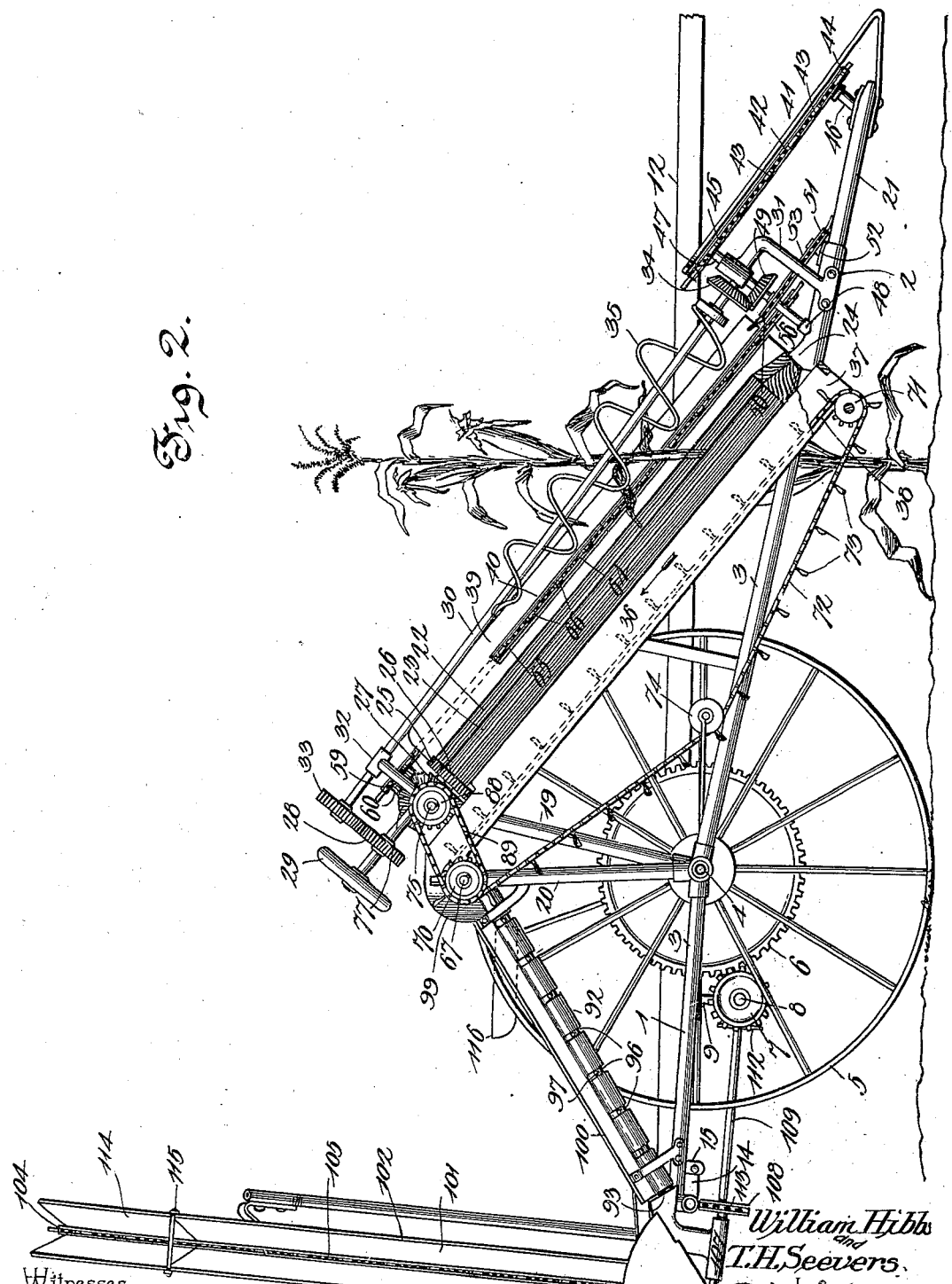

No. 684,934. Patented Oct. 22, 1901.
W. HIBBS & T. H. SEEVERS.
CORN HARVESTER.
(Application filed Mar. 14, 1901.)
(No Model.) 4 Sheets—Sheet 3.
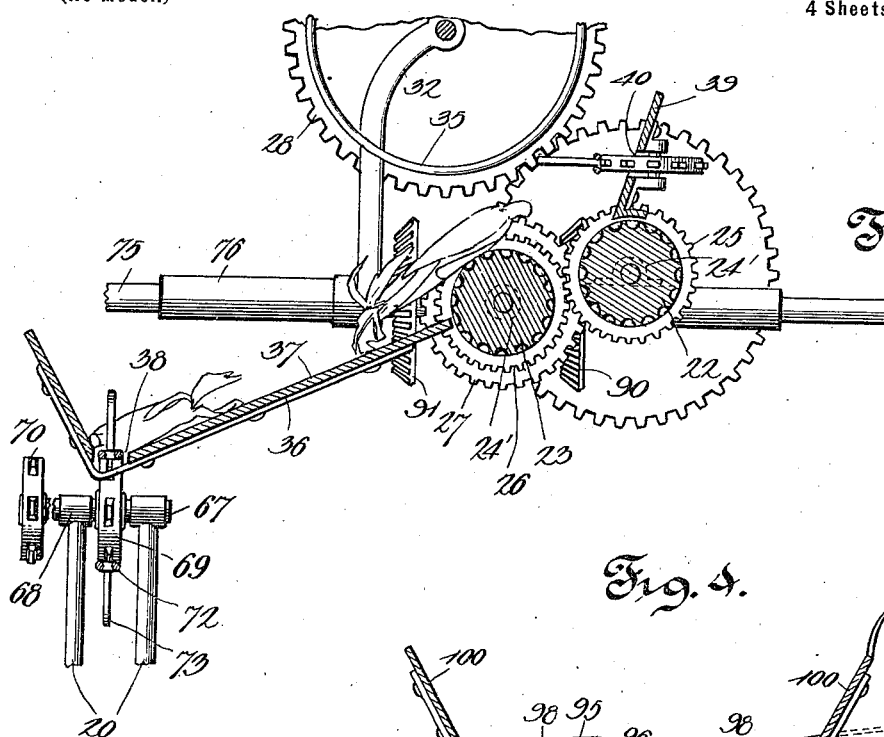
Witnesses
William Hibbs & T.H. Seevers, Inventors.
By C.A. Snow & Co.
Attorneys No. 684,934. Patented Oct. 22, 1901.
W. HIBBS & T. H. SEEVERS.
CORN HARVESTER.
(Application filed Mar. 14, 1901.)

(No Model.) 4 Sheets—Sheet 4.

UNITED STATES PATENT OFFICE.

WILLIAM HIBBS AND THOMAS H. SEEVERS, OF OSKALOOSA, IOWA.

CORN-HARVESTER.

SPECIFICATION forming part of Letters Patent No. 684,934, dated October 22, 1901.

Application filed March 14, 1901. Serial No. 51,113. (No model.)

*To all whom it may concern:*

Be it known that we, WILLIAM HIBBS and THOMAS H. SEEVERS, citizens of the United States, residing at Oskaloosa, in the county of Mahaska and State of Iowa, have invented a new and useful Corn-Harvester, of which the following is a specification.

This invention is an improved corn-harvesting machine for snapping the ears of corn from the standing stalks and husking the said ears; and it consists in the peculiar construction and combination of devices hereinafter fully set forth and claimed.

Figure 1:
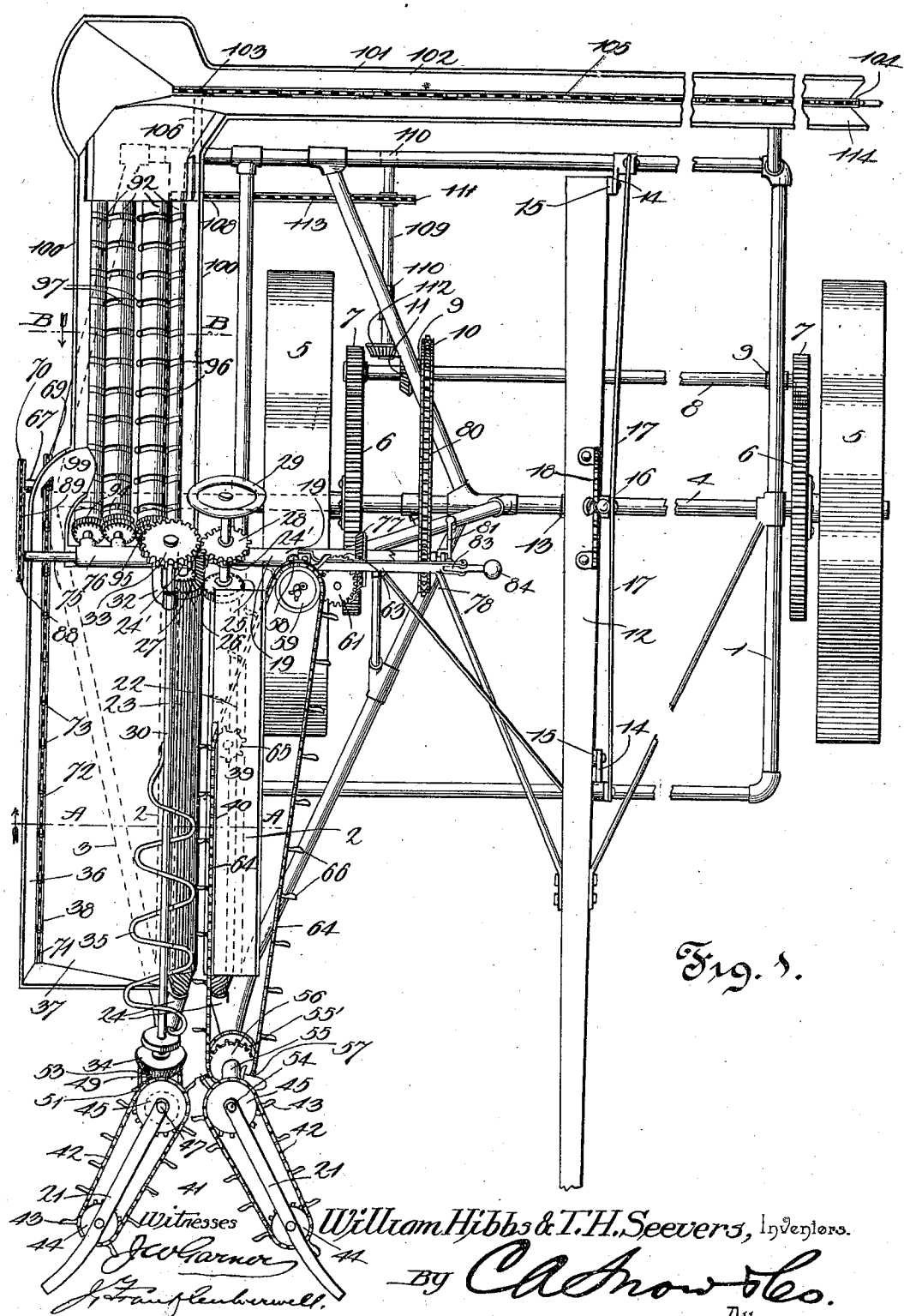
Figure 6:
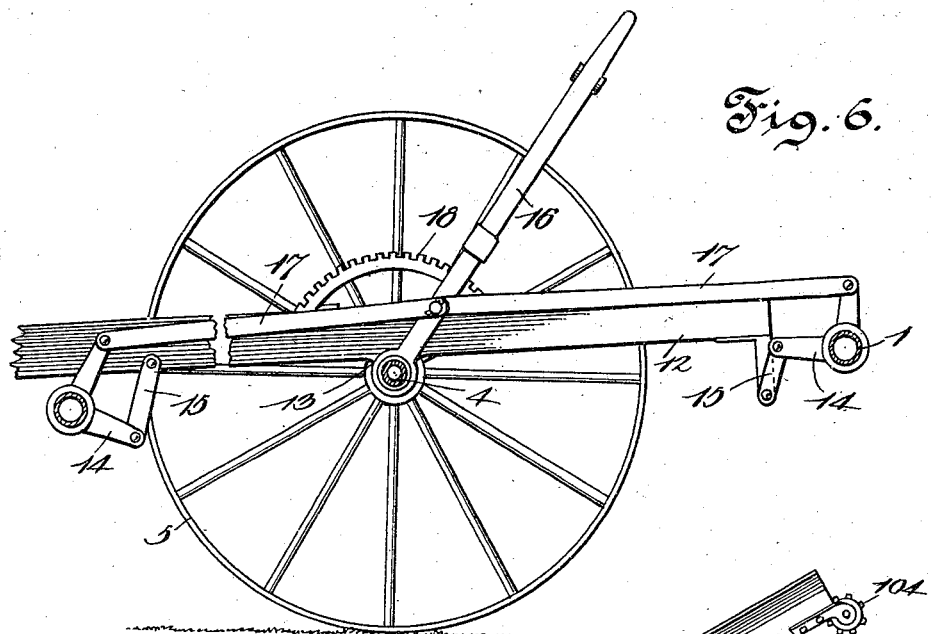
Figure 7:
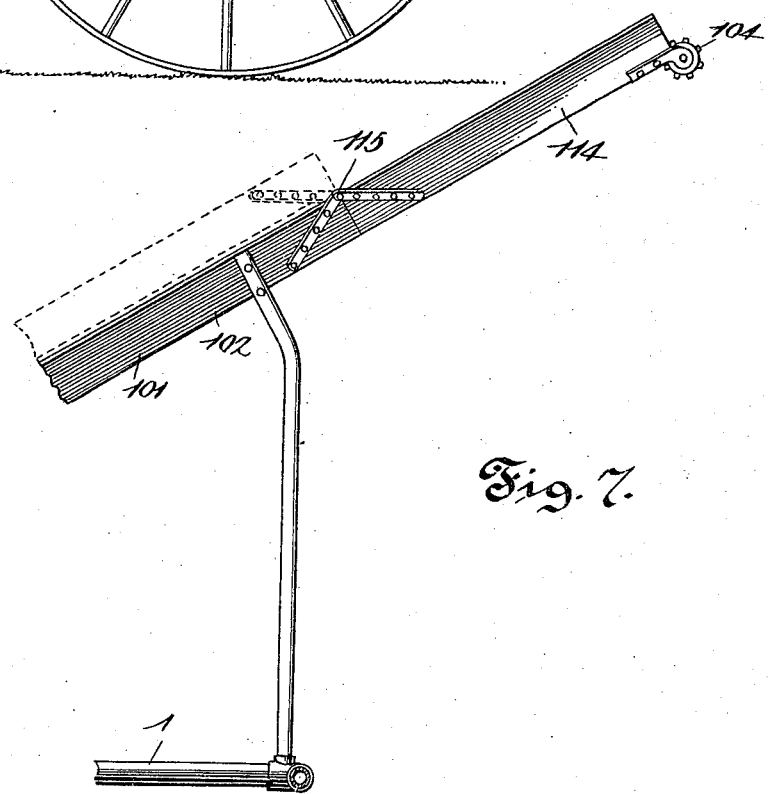

In the accompanying drawings, Figure 1 is a top plan view of a corn-harvesting machine constructed in accordance with this invention. Fig. 2 is a side elevation of the same. Fig. 3 is a detail transverse sectional view of the same taken on the line A A of Fig. 1. Fig. 4 is a similar view taken on a plane indicated by the line B B of Fig. 1. Fig. 5 is a detail view, being a section of one of the bearings and an elevation of one of the shafts and the gears mounted thereon and connected thereto. Fig. 6 is a detail sectional view of the main frame, showing the means for tilting the same. Fig. 7 is a detail view of the elevator for the harvested and husked corn.

The frame 1 of the harvester is of any suitable construction, here shown and preferably formed of metallic pipes. On one side of the frame are a pair of parallel bars 2, spaced a suitable distance apart and adapted in the operation of the machine to pass on opposite sides of a row of standing cornstalks. The outer bar 2 is suitably braced, as at 3. An axle-shaft 4 has its bearings in the said frame and is provided with suitable traction and supporting wheels 5. In practice one or both of said wheels will be loose on said shaft and connected thereto by pawl-and-ratchet mechanism of the usual construction to enable the machine to be readily turned. The pawl-and-ratchet mechanism is not shown, as the same is well understood and forms no part of our invention. Fast on the said shaft are master gear-wheels 6, which engage pinions 7 on a counter-shaft 8, that is disposed in rear of axle-shaft 4 and is journaled in suitable bearings 9, with which the frame 1 is provided. The said counter-shaft is provided with a sprocket-wheel 10 and with a miter gear-wheel 11. The tongue 12 is pivotally mounted on the axle-shaft 4, as at 13. On the front and rear sides of the frame 1 are mounted bell-crank levers 14. One arm of each of the said bell-crank levers is connected to the tongue, at points respectively in front and rear of the axle-shaft, by a link 15. A hand-lever 16 is fulcrumed on the axle-shaft and is connected to the bell-crank levers 14 by link-bars 17. Hence by moving the said hand-lever the front side of the frame may be raised or lowered, as will be understood. On the tongue is mounted a segment-plate 18, which is concentric with the axle-shaft, and the said lever 16 is provided with a spring-pressed dog of usual construction to engage the said segment-plate, and thereby lock the said lever at any desired adjustment.

A pair of arch-frames 19 20 rise from one side of the frame 1 and are arched over the space between the bars 2. The latter are provided at their front ends with shoes 21, which diverge forwardly and serve to drive the cornstalks between the bars 2 as the machine advances. A pair of inclined snapping-rolls 22 23 are journaled in bearings 24, with which the bars 2 are provided, and at their upper ends are journaled in suitable bearings 24', with which the arch-frame 19 is provided. The said snapping-rolls are spaced a suitable distance apart and are disposed in the vertical plane of the space between the bars 2. Hence as the machine advances the standing cornstalks pass between the proximate sides of the said snapping-rolls. The lower ends of the snapping-rolls are of conical form to facilitate the passage of the cornstalks between the snapping-rolls, and the latter are provided at their upper ends with gears 25 26, respectively, which mesh with each other. The shaft of the roll 23 is provided at its upper end with a miter gear-wheel 27. The shaft of roll 22 is provided near its upper end with a gear-wheel 28. At the extended rear end of the shaft of said roll 22 is secured a fly-wheel 29, of suitable size and weight. A shaft 30, which is substantially parallel with the snapping-roll 23, is disposed above the same and in the vertical plane of the outer side thereof. The said shaft is journaled in bearings 31 32, the former being attached to the outer bar 2 and the latter being supported by the arch-frame 19. At the upper end of this inclined shaft 30 is a spur-gear 33, which engages the spur 28. At the lower end of said shaft is a miter gear-wheel 34. Said shaft carries a feed-worm 35, which is formed of a single bar or rod disposed spirally around the said shaft and out of contact therewith, excepting at the ends of said rod or bar, which are secured to said shaft. The said feed-worm is hence of skeleton or open construction. The snapping-roll 23, which is termed the "outer roll," is disposed in a lower plane that the inner snapping-roll 22, as shown in Figs. 2 and 3. An inclined elevating-trough 36, the bottom of which is inclined laterally, as at 37, is disposed on the outer side of the outer snapping-roll and is suitably mounted and supported. In the lower portion of the said elevating-trough is a longitudinal opening 38.

An inclined guard-board 39 is disposed above the inner snapping-roll 22 and is suitably mounted and supported. The said guard-board is provided with a longitudinal slot 40. Disposed above each of the forwardly-diverging shoes 21 is an endless traveling feeder 41. Each of the said feeders comprises an endless chain 42, armed with spurs 43, and sprocket-wheels 44 45, which carry said chains. The said chains are inclined at a suitable angle, as shown, and diverge from each other forwardly, as shown in Fig. 1. The sprocket-wheels 44 are mounted on bearings 46, with which the shoes 21 are provided. The sprocket-wheel 45 of the outer feed-carrier is fast on the upper end of an inclined shaft 47, which is journaled in the bearing 31 and has its lower end stepped or otherwise mounted in a bearing 48, with which the outer bar 2 is provided. The said shaft is provided with a miter-gear 49, which engages the miter-gear 34, and is further provided with a sprocket-wheel 50. A sprocket-wheel 51 is mounted at a short distance in advance of shaft 47 and on a bearing 52, with which the outer bar 2 is provided. An endless sprocket-chain 53 connects the sprocket-wheels 50 51. Said sprocket-wheels and sprocket-chain constitute an endless traveling feeder disposed on one side of the contracted throat or passage between the rear portions of the shoes 21 at the front ends of the bars 2.

The sprocket-wheel 45 of the inner feeder 41 is carried by a shaft 54, which is journaled in a bearing 55, that is similar to the bearing 31 and has its lower end stepped in a bearing with which the inner bar 2 is provided. The said shaft 54 is provided with sprocket-wheels 55' 56. The latter operates an endless chain 57, which is similar to the chain 53 and is disposed on the opposite side of the contracted throat between the rear ends of the shoes 21. The front portion of the said chain is carried by a sprocket-wheel (not shown) which is similar to the sprocket-wheel 51.

An inclined shaft 58 is journaled in suitable bearings with which the frame 19 is provided, the said shaft being disposed on the upper side of said frame and at a suitable distance within the guard-board 39 and opposite the rear end of the latter. The said shaft 58 carries a sprocket-wheel 59 and a spur-wheel 60. The latter is engaged by a similar wheel 61 on a shaft 62. A miter gear-wheel 63 rotates with said spur-wheel 61. An endless traveling carrier-chain 64 connects the sprocket-wheels 56 and 59. One lead of the said carrier-chain is disposed in the slot 40 of the guard-board 39 and is maintained therein by a direction sheave or wheel 65. Said carrier-chain is provided with suitable spurs 66.

A shaft 67 is journaled in bearings 68, with which the frame 20 is provided. Said shaft is provided with a sprocket-wheel 69, which enters the rear end of the slot 38 of the elevator-trough 36. At the outer end of the said shaft is a sprocket-wheel 70. A sprocket-wheel 71 has its shaft journaled in bearings under the lower end of the trough 36. The said sprocket-wheel is disposed in the front end of the slot 38. An endless traveling carrier-chain 72 connects the sprocket-wheels 69 71. Its upper lead operates in the slot 38, and the said chain is provided with suitable projecting spurs 73. A sheave 74 bears on the lower lead of said carrier-chain, as shown in Fig. 2. A transversely-disposed shaft 75, which is disposed in rear of the upper ends of the snapping-rolls, is journaled in a sleeve-bearing 76, with which frame 19 is provided. Said shaft 75 has a miter gear-wheel 77, which engages miter gear-wheel 63. A sprocket-wheel 78 is fast with a clutch 79, which is loose on said shaft and is adapted to engage and disengage wheel 77. An endless sprocket-chain 80 connects the sprocket-wheel 10 with the sprocket-wheel 78. A lever 81 is pivotally connected at its lower end to the frame 19, as at 82. At the upper end of the said lever is a bell-crank lever 83, one of the arms of which is weighted, as at 84. Said lever 81 in connected to a sleeve 85, which engages an annular groove 86, formed in the clutch 79, and the bell-crank lever 83 is pivotally connected to one end of a link-rod 86', as at 87. The opposite end of the said link-rod is securely fastened to the sleeve-bearing on the frame 19. It will be understood from the foregoing that when the sprocket-wheel 78 is clutched to the miter-wheel 77, which is fast on shaft 75, the latter will be rotated by power communicated thereto from the counter-shaft 8 and that when said sprocket-wheel 78 is unclutched said shaft will remain idle. It will be further understood that the clutch is operated by the lever 81 and weighted bell-crank lever 83 and that the weight carried by the latter maintains the sprocket-wheel 78 in either clutched or unclutched position. At the outer end of the shaft 75 is a sprocket-wheel 88, which is connected to the sprocket-wheel 70 by an endless sprocket-chain 89. Thereby power is conveyed from the shaft 75 to the shaft 67, and hence the carrier-chain 72 is operated. Said shaft 75 is further provided with miter gear-wheels 90 91. The former engages the miter gear-wheel 27 at the upper end of the outer lower snapping-roll 23, and hence power is conveyed to the snapping-rolls.

Husking-rollers 92 have their upper ends journaled in bearings with which frame 19 is provided. The lower ends of the husking-rolls are journaled in bearings 93 at the rear side of frame 1. The upper ends of the husking-rolls are provided with intergeared spur-wheels 94, and one of said rolls is also provided with a miter gear-wheel 95, which engages the similar gear 91 on shaft 75. Thereby power is conveyed to the husking-rolls and the latter are rotated. Two pairs of husking-rolls are here shown; but the number thereof may be varied. Each husking-roll is provided at suitable distances apart with a series of annular grooves 96. In each of said grooves is secured a spring 97, preferably of the form shown, and the said springs carry husking studs or pins 98, which normally project beyond the surfaces of the rolls, but which are adapted by the springs to yield to avoid injury to the said spurs or pins or to the ears of corn. The trough 36 is provided at its upper end with a spout or chute 99, which delivers the ears of corn to the husking-rolls. Guard-boards 100 are disposed above the outer husking-rolls and form a trough to prevent the ears of corn while being husked from passing over the sides of the husking-rolls.

Disposed transversely on the rear side of frame 1 is an elevator 101, which comprises an inclined trough 102, and an endless traveling carrier, which operates in a slot in the bottom of said trough. The said carrier comprises a sprocket-wheel 103 at the inner lower end of the trough, a similar sprocket-wheel 104 at the outer upper end thereof, and an endless carrier-chain 105, which connects the said sprocket-wheels. The sprocket-wheel 103 is carried by a shaft 106, which is journaled in bearings 107 and is provided with a sprocket-wheel 108. A shaft 109 is disposed parallel to the shaft 106, is journaled in suitable bearings 110, and is provided with a sprocket-wheel 111 and at its front end with a miter gear-wheel 112. The latter engages the miter-wheel 11 on counter-shaft 8, and thereby communicates power to the shaft 109. An endless sprocket-chain 113 connects the sprocket-wheels 108 and 111, and hence communicates power to the carrier-chain 105. The function of the elevator, as will be understood, is to convey the husked corn from the harvesting-machine to a wagon driven alongside the same and slightly to the rear thereof. The outer upper section 114 of the elevator is hinged, as at 115, and thereby the same is adapted to be folded in a vertical plane over the lower main section of the elevator, as indicated in dotted lines in Fig. 7, to compactly dispose the elevator when the machine is not in operation. A suitable seat 116 for the driver is mounted in any suitable manner on the frame 1.

The conical lower ends of the respective snapping-rolls are provided with reversely-disposed worm-threads, as shown, whereby force-feed worms are formed at the lower front ends of the snapping-rolls, which are effective in grasping the cornstalks and feeding them between the rolls. The latter are fluted longitudinally, as indicated in the drawings, to increase their efficiency in snapping off the ears from the stalks.

In the construction of the machine the sprocket-wheels 45 on the shafts 47 and which operate the gathering-chains 42 are larger than the sprocket-wheels which operate the throat feed-chains 53. Hence the gathering-chains run at a higher rate of speed than the throat feed-chains and serve to raise fallen stalks as the same are engaged by the machine.

It will be understood that the inclined rolls having the force-feed worms at their lower ends may be used in connection with corn-binders and other machines, and I do not therefore limit myself to the use thereof in connection with mechanism for husking the corn.

Having thus described the invention, what is claimed as new is—

1. In a corn-harvester, the combination of a pair of snapping-rolls, a carrier above one of said rolls and a worm above the other roll, substantially as described.

2. In a corn-harvester, the combination of a pair of snapping-rolls, one disposed in a lower plane than the other, a carrier above the upper roll, a worm above the lower roll, and a receiver on one side of the latter, substantially as described.

3. In a corn-harvester, the combination of a pair of snapping-rolls, a carrier above one of said rolls and a worm above the other roll, a receiver, on one side of the latter, a carrier in said receiver, and a shaft 75 geared to said snapping-rolls, carriers and worm, substantially as described.

4. In a corn-harvester, the combination of a pair of snapping-rolls, a carrier above one of said rolls and a worm above the other roll, a receiver on one side of the latter, a carrier in said receiver, husking-rolls in rear of said receiver, and a shaft 75 geared to said snapping-rolls, husking-rolls, carriers and worm, substantially as described.

5. In a corn-harvester, the combination of a pair of snapping-rolls, a guard above one of said rolls, a receiver on the outer side of the other roll, and a revoluble open worm over said last-mentioned roll, to convey ears of corn laterally over said roll to said receiver, substantially as described.

6. In a corn-harvester, the combination of a pair of inclined snapping-rolls, an elevator disposed on one side thereof, a worm disposed over one of said rolls proximate to the said elevator and an endless traveling carrier element disposed over the other roll, substantially as described.

7. In a corn-harvester, the combination of a pair of snapping-rolls, a shaft 75 to which they are geared, an endless traveling carrier 64 above one of said snapping-rolls and driven by said shaft, a shaft above the other snapping-roll and having a worm above said snapping-roll, said shaft being geared to one of said snapping-rolls, and endless traveling throat-feed and gathering elements at the front ends of said snapping-rolls, said throat-feed and gathering elements being driven by said carrier 64 and said worm-shaft, substantially as described.

8. In a corn-harvester, the combination of a pair of snapping-rolls, a shaft 75 to which they are geared, an endless traveling carrier 64 above one of said snapping-rolls and driven by said shaft, a shaft above the other snapping-roll and having a worm above said snapping-roll, said shaft being geared to one of said snapping-rolls, endless traveling throat-feed and gathering elements at the front ends of said snapping-rolls, said throat-feed and gathering elements being driven by said carrier 64 and said worm-shaft, an elevator-trough on one side of said worm-shaft, a carrier 72 in said elevator-trough, and driven by said shaft 75, and husking-rolls in rear of said elevator-trough and geared to said shaft 75, substantially as described.

9. In a corn-harvester, the combination of a pair of inclined snapping-rolls, one disposed in a lower plane than the other, a guard-board above said higher roll, an endless traveling carrier element in a slot in said guard-board, a carrier-worm over said lower roll, and an elevator on one side of said lower roll, substantially as described.

10. In a corn-harvester, the combination of a pair of inclined snapping-rolls, one disposed in a lower plane than the other, a guard-board disposed above the upper snapping-roll, an endless traveling carrier element disposed above said upper snapping-roll, a conveying-trough on one side of the lower snapping-roll, an endless traveling carrier element having one lead operating in the bottom of said conveying-trough and a worm disposed above said lower snapping-roll, substantially as described.

In testimony that we claim the foregoing as our own we have hereto affixed our signatures in the presence of two witnesses.

WILLIAM HIBBS.
THOMAS H. SEEVERS.

Witnesses:
  B. J. SNYDER,
  D. L. COLE.